United States Patent
Mukundala et al.

(10) Patent No.: US 10,347,115 B1
(45) Date of Patent: Jul. 9, 2019

(54) METHOD FOR ALERTING THE GUEST TO COLLECT THE BELONGINGS IN SAFE BEFORE CHECKOUT

(71) Applicant: Carrier Corporation, Jupiter, FL (US)

(72) Inventors: Sumanth Kumar Mukundala, Telangana (IN); Adam Kuenzi, Silverton, OR (US); Mohammed Maqsood, Telangana (IN)

(73) Assignee: CARRIER CORPORATION, Jupiter, FL (US)

( * ) Notice: Subject to any disclaimer, the term of this patent is extended or adjusted under 35 U.S.C. 154(b) by 0 days.

(21) Appl. No.: 15/964,865

(22) Filed: Apr. 27, 2018

(30) Foreign Application Priority Data

Feb. 28, 2018 (IN) .............................. 201811007512

(51) Int. Cl.
| | |
|---|---|
| G08B 13/14 | (2006.01) |
| G08B 21/24 | (2006.01) |
| E05G 1/10 | (2006.01) |
| H04N 7/18 | (2006.01) |
| H04W 4/38 | (2018.01) |
| H04W 4/029 | (2018.01) |

(52) U.S. Cl.
CPC .............. *G08B 21/24* (2013.01); *E05G 1/10* (2013.01); *H04N 7/183* (2013.01); *H04W 4/029* (2018.02); *H04W 4/38* (2018.02)

(58) Field of Classification Search
CPC .......... G08B 21/24; E05G 1/10; H04N 7/183; H04W 4/38; H04W 4/029
USPC ............................ 340/569, 696.1, 5.1, 309.7
See application file for complete search history.

(56) References Cited

U.S. PATENT DOCUMENTS

| | | | | |
|---|---|---|---|---|
| 5,979,198 A | * | 11/1999 | Haas-Trober | ......... E05B 43/005 70/268 |
| 7,486,188 B2 | * | 2/2009 | Van Alstyne | .......... G06Q 10/08 340/10.1 |
| 2006/0145850 A1 | | 7/2006 | Krstulich | |
| 2014/0051355 A1 | | 2/2014 | Ahearn et al. | |
| 2014/0055276 A1 | | 2/2014 | Logan et al. | |
| 2014/0354398 A1 | * | 12/2014 | Boday | ................ G07C 9/00912 340/5.2 |
| 2015/0154847 A1 | | 6/2015 | Oliver et al. | |

(Continued)

FOREIGN PATENT DOCUMENTS

| | | |
|---|---|---|
| CN | 102821185 A | 12/2012 |
| CN | 103318082 A | 9/2013 |

(Continued)

OTHER PUBLICATIONS

Hermann, Jeffrey, "Ikeyp—The World's Smartest Personal Safe", Indiegogo Newsletter, Accessed on Feb. 13, 2018 at https://www.indiegogo.com/projects/ikeyp-the-world-s-smartest-personal-safe-smartphone-health-3#/ (8 pp.).

*Primary Examiner* — Toan N Pham
(74) *Attorney, Agent, or Firm* — Cantor Colburn LLP

(57) ABSTRACT

A method of detecting when a personal item is left in a safe is provided. The method comprising: receiving a first status of a safe in a room, the first status indicating that the safe has been locked; retrieving a period of stay for an individual assigned to the room, the period of stay includes a checkout time; and creating a reminder in a schedule system to activate an alarm within a selected time period of the checkout time, the reminder indicating that the safe is locked.

20 Claims, 4 Drawing Sheets

(56) References Cited

U.S. PATENT DOCUMENTS

2015/0170448 A1 6/2015 Robfogel et al.
2017/0109953 A1 4/2017 Mullane et al.

FOREIGN PATENT DOCUMENTS

| CN | 103758435 A | 4/2014 |
| CN | 104806085 A | 7/2015 |
| CN | 204627281 U | 9/2015 |
| CN | 204877016 U | 12/2015 |
| CN | 205100755 U | 3/2016 |
| WO | 2008033098 A1 | 3/2008 |

* cited by examiner

METHOD FOR ALERTING THE GUEST TO COLLECT THE BELONGINGS IN SAFE BEFORE CHECKOUT

CROSS-REFERENCE TO RELATED APPLICATIONS

This application claims the benefit of Provisional Indian Application No. 201811007512 filed Feb. 28, 2018, which is incorporated herein by reference in its entirety.

BACKGROUND

The subject matter disclosed herein generally relates to the field of safes, and more particularly to an apparatus and method for operating safes.

Existing safes, such as, for example in hotel rooms, offer the ability to safely store personal belongings for a temporary time-period. When the time-period expires or when the hotel guest checks out and leaves the room, it is often easy for the individual to forget that they had stored personal belongings in the safe. It is often a time-consuming and expensive process for an individual to try to retrieve their belongings once they leave the room.

BRIEF SUMMARY

According to one embodiment, a method of detecting when a personal item is left in a safe is provided. The method comprising: receiving a first status of a safe in a room, the first status indicating that the safe has been locked; retrieving a period of stay for an individual assigned to the room, the period of stay includes a checkout time; and creating a reminder in a schedule system to activate an alarm within a selected time period of the checkout time, the reminder indicating that the safe is locked.

In addition to one or more of the features described above, or as an alternative, further embodiments may include: activating the alarm when a current time is within the selected time period of the checkout time.

In addition to one or more of the features described above, or as an alternative, further embodiments may include: activating the alarm when a current time is within the selected time period of the checkout time and a most recent status of the safe indicates that the safe is locked.

In addition to one or more of the features described above, or as an alternative, further embodiments may include: receiving a second status of the safe in the room, the second status indicating that the safe has been unlocked; and deleting the reminder in the schedule system.

In addition to one or more of the features described above, or as an alternative, further embodiments may include: detecting whether an access control operably associated with a door to the room has been actuated; and activating the alarm when a current time is within the selected time period of the checkout time and the access control has been actuated.

In addition to one or more of the features described above, or as an alternative, further embodiments may include: detecting a location of the individual assigned to the room; and activating the alarm when the location of the individual indicates that the individual is leaving the room within a second selected time period of the checkout time.

In addition to one or more of the features described above, or as an alternative, further embodiments may include that the detecting a location of the individual assigned to the room further comprises: collecting positional data of a mobile device belonging to the individual.

In addition to one or more of the features described above, or as an alternative, further embodiments may include that the first status of the safe is advertised by the safe using wireless signal is Bluetooth, wherein the schedule system receives the first status through a Bluetooth advertisement and processes the data in the advertisement to determine the status of the safe when the first status is received.

In addition to one or more of the features described above, or as an alternative, further embodiments may include that the reminder includes a safe contents status depicting at least one of a weight of contents of the safe and an image of contents of the safe.

In addition to one or more of the features described above, or as an alternative, further embodiments may include that the schedule system is installed within at least one of a mobile device, a room management system, and a server.

According to another embodiment, a method of detecting when a personal item is left in a safe is provided. The method comprising: receiving a first access request; receiving a period of stay for an individual assigned to the room in response to the first access request, the period of stay includes a checkout time; receiving a second access request to lock the safe; and creating a reminder in a schedule system in the safe to transmit an alarm within a selected time period of the checkout time, the reminder indicating that the safe is locked.

In addition to one or more of the features described above, or as an alternative, further embodiments may include: transmitting the alarm to at least one of a mobile device and a room management system when a current time is within the selected time period of the checkout time.

In addition to one or more of the features described above, or as an alternative, further embodiments may include: transmitting the alarm to at least one of a mobile device and a room management system when a current time is within the selected time period of the checkout time and a most recent status of the safe indicates that the safe is locked.

In addition to one or more of the features described above, or as an alternative, further embodiments may include: receiving a third access request to unlock the safe; and deleting the reminder in the schedule system.

In addition to one or more of the features described above, or as an alternative, further embodiments may include: detecting an access request to the access control operably associated with a door to the room; and activating the alarm when a current time is within the selected time period of the checkout time and the access control has been actuated by the access request.

In addition to one or more of the features described above, or as an alternative, further embodiments may include: activating the alarm from at least one of a mobile device and a room management system when a location of the individual indicates that the individual is leaving the room within a second selected time period of the checkout time.

In addition to one or more of the features described above, or as an alternative, further embodiments may include that the location of the individual assigned to the room is determined by collecting positional data of a mobile device belonging to the individual.

In addition to one or more of the features described above, or as an alternative, further embodiments may include that the first request indicates that an access control operably associated with a door to the room has been actuated.

In addition to one or more of the features described above, or as an alternative, further embodiments may include that the first request is transmitted to the safe from at least one of a mobile device and a key card.

In addition to one or more of the features described above, or as an alternative, further embodiments may include that the period of stay is received from at least one of the mobile device and the key card.

Technical effects of embodiments of the present disclosure include alerting an individual assigned to a room when they are leaving the room that they have left their belongings in the safe.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
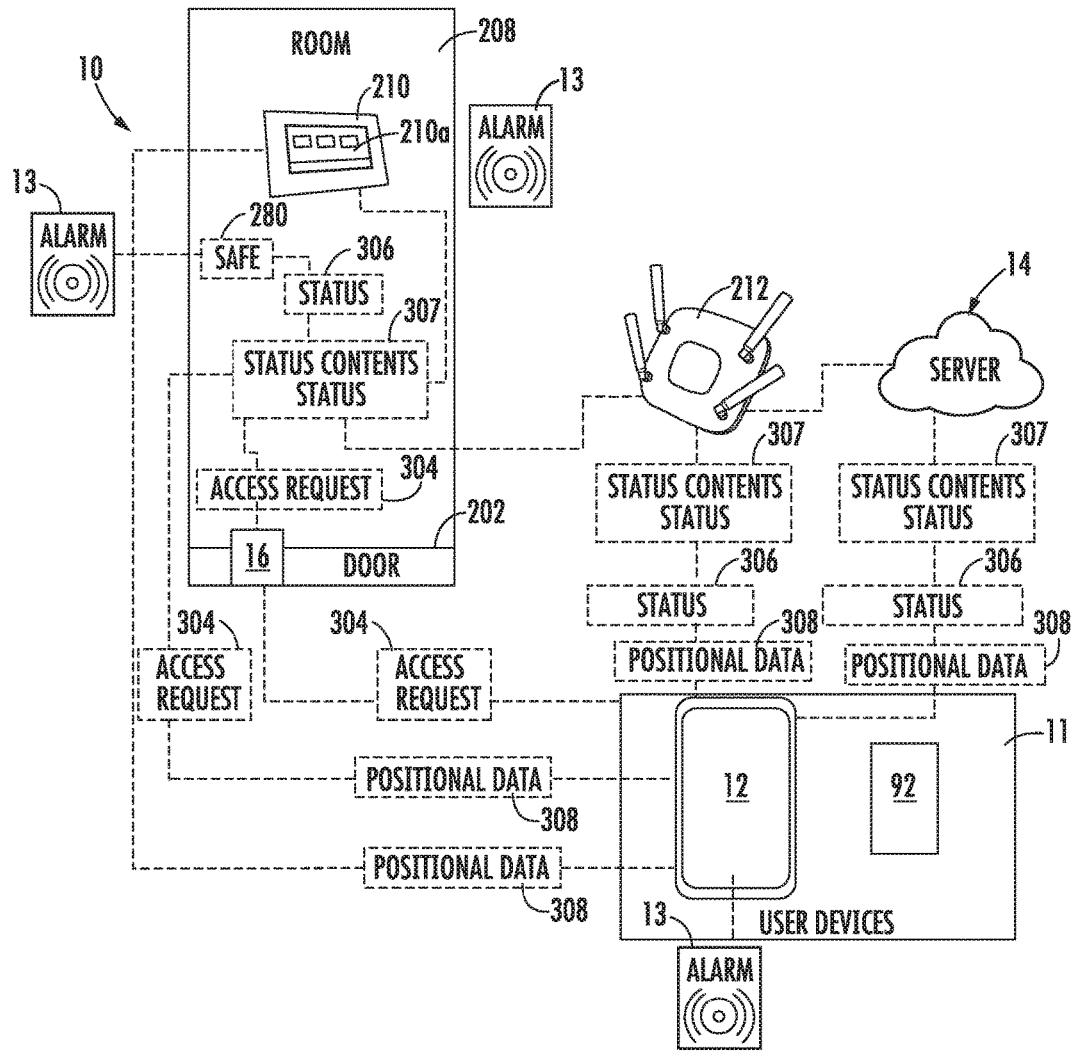
FIG. 1 illustrates a general schematic system diagram of a safe reminder system, in accordance with an embodiment of the disclosure.

FIG. 1 schematically illustrates a safe reminder system 10. The system 10 generally includes a user device 11, a server 14, a wireless access protocol device 212, a room management system 210, an access control 16, and a safe 280. It should be appreciated that while only one safe 280 is illustrated, the safe reminder system 10 may include any number of safes 280. It should be appreciated that, although particular systems are separately defined in the schematic block diagrams, each or any of the systems may be otherwise combined or separated via hardware and/or software. In another embodiment, the access controls 16 may control access through a door 202 to a room 208. It should be appreciated that while one door 202 and room 208 are illustrated, the safe reminder system 10 may include any number of doors 202 and rooms 208. Further, there may be multiple doors 202 and access controls 16 for each room 208. A room management system 210 may be located in each room 208. The room management system 210 is configured to control operations of a room 208 including but not limited to temperature and lighting.

For a selected period of stay (e.g. period of time for an individual who is a guest staying at a hotel) the user device 11 belonging to an individual may be granted access to one or more access controls 16 (e.g. the door lock on a hotel room assigned to the individual). The user device 11 may also be granted access to open and close the safe 280 depending upon the type of safe 280, discussed further below. When an individual checks into the hotel their user device 11 will be granted access to a room 208 and the safe 280 within the room 208. Alternatively, they may utilize a pin code via a key pad 480 (see FIG. 2) for access. There may be one or more user devices 11 assigned to a room 208 (e.g. a husband and a wife), thus embodiments disclosed herein may apply to multiple user devices 11 per room 208. An individual may utilize their user device 11 to unlock and/or lock the access control 16 operably connected to their assigned room 208 through an access request 304. An individual may also enter a pin code via a key pad 480 (see FIG. 2) to unlock and/or lock the safe 280 operably connected to their assigned room 208. The user device 11 may store credentials to unlock and/or lock the access control 16 and safe 280. Some credentials may be used for multiple access controls 16 and safes 280 if there are multiple access controls 16 for a single assigned room 208 or the individual is assigned access to multiple rooms 208. For example, an access control 16 operably connected to an individual's hotel room and an access control 16 operably connected to a hotel pool may respond to the same credential. Other credentials may be specific to a single access control 16 or safe 280.

The user device 11 may be a physical key card 92 and/or a mobile device 12. The user device 11 may transmit an access request 304 to the access control 16 or safe 280 by short-range radio transmission when the user device 11 is placed proximate the access control 16 or by the user device 11 being inserted into the access control 16 or safe 280 to read the user device (e.g. a magnetic strip on an encoded card 92). The physical key card 92 is capable of being encoded with card data, such as, for example, a magnetic strip or RFID chip. The card data may include credentials to grant access to a specific access control 16 or safe 280. For example, for a period of stay for the user device 11 may be granted access to a specific access control 16 or safe 280. The mobile device 12 is a wireless capable handheld device such as a smartphone that is operable to communicate with the server 14, the access controls 16, and the safe 280. The server 14 may provide credentials and other data to the access control 16 or safe 280, such as firmware or software updates to be communicated to one or more of the access controls 16 or safes 280. Although the server 14 is depicted herein as a single device, it should be appreciated that the server 14 may alternatively be embodied as a multiplicity of systems, from which the mobile device 12 receives credentials and other data.

Each access control 16 may be a wireless-capable, restricted-access, or restricted-use device such as wireless locks, access control readers for building entry, and other restricted-use machines. The user device 11 submits credentials to the access controls 16, thereby selectively permitting a user to access or activate functions of the access controls 16. A user may, for example, submit a credential to an electromechanical lock to unlock it, and thereby gain access to a room 208.

Each safe 280 may be a wireless-capable, restricted-access, or restricted-use device such as wireless locks and other restricted-use machines. The user device 11 submits credentials to the access controls 16, thereby selectively permitting a user to access or activate functions of the safe 280, such as unlocking and/or locking the safe 280. A user may, for example, submit a credential to an electromechanical lock to unlock it, and thereby gain access to the safe. Alternatively a user may enter a pin code to lock or unlock the safe 280. In some embodiments the safe 280 will learn a pin code when it is entered to lock the safe 280 and then will require the same pin code to be entered to unlock the safe 280. In other embodiments, the safe 280 will require that a user device 11 submits a credential that is valid before allowing a new pin code to be entered to lock the safe 280.

The safe 280 is configured to advertise a status 306 of the safe 280. For example, the status 306 of the safe 280 may indicate whether the safe 280 is locked or unlocked and/or when a door of the safe 280 is opening or closing. The safe 280 may also advertise or send a safe contents status 307 that depicts details of the contents (i.e. personal belongings) of the safe 280, such as, for example a weight of the contents and/or an image of the contents. The status 306 and the contents status 307 are advertised or sent to the mobile device 12 and/or room management system 210 via a wireless signal, such as, for example Bluetooth. The status 306 and the contents status 307 may be secured by encrypting on sending and decrypting on receiving as is known in the art of data transfer between devices. The mobile device 12 and/or the room management system 210 is configured to receive the status 306 and/or the safe contents status 307. If the status 306 indicates that the safe 280 has been locked, presumably with personal belongings inside of the safe 280, then a schedule reminder may be established in a schedule system on the mobile device 12, the room management system 210, and/or the server 14. If the safe contents status 307 indicates that the safe 280 contains contents (i.e. personal belongings), then a schedule reminder may be established in a schedule system on the mobile device 12, the room management system 210, and/or the server 14. The status 306 and the safe contents status 307 may be used in combination and/or alone for establishing schedule reminders in the scheduling system. For example, the schedule reminder may be prompted by the status 306 but then may include a safe contents status 307 (i.e. an image of the personal belongings in the safe 280) in the schedule reminder. In another example, the status 306 of the safe 280 may prompt an alarm 13 on the mobile device 12 for a user of the mobile device 12 to take a picture with the mobile device 12 of the personal belongings in the safe 280 and that picture may be saved in the schedule reminder as the safe contents status 307.

The schedule system is installed within at least one of the mobile device 12, the room management system 210, and the server 14. The schedule reminder may be configured to activate an alarm 13 on the mobile device 12 and/or the room management system 210 within a selected time period of an individual's check out time. For example, the schedule reminder may activate an alarm 13 about one hour prior to the individual's scheduled check out time. The schedule reminder is intended to remind the individual that they may still have personal belongings in the safe 280. The alarm 13 may be audible, vibratory, and/or visual. For example, if the safe 280 has not been unlocked within a selected time period of the checkout time, then the mobile device 12 may start flashing and the mobile device 12 may produce an audible sound (e.g. beep). The mobile device 12 may be a smart wearable (e.g. smart watch) being worn by the individual and wirelessly connected to the mobile device 12, which starts flashing, vibrating, and/or the smart wearable may produce an audible sound (e.g. beep). The alarm 13 may be activated on the room management system 210 if the safe 280 is still locked within a selected time period of the checkout time. For example, a display screen 210*a* of the room management system 210 may start flashing and/or the room management system 210 may produce an audible sound (e.g. beep). In embodiment, the schedule system may be stored on the server 14 and then the server may transmit a message to the mobile device 12 and/or the room management system 210 that activates an alarm 13. The message may be a text message, an email, and/or a phone call. Additionally, an alarm 13 may also be activated on the safe, such as, for example, an audible beep.

Further, if a status 306 indicating that the safe 280 has been unlocked (and personal belongings removed) is received by the mobile device and/or the room management system 210 then the schedule reminder may be deleted. Additionally, if a safe contents status 307 indicating that the contents (i.e. personal belongings) of the safe 280 have been removed is received by the mobile device 12 and/or the room management system 210 then the schedule reminder may be deleted. The selected period of stay of an individual may be stored in the server 14 and may be transmitted to at least one of the mobile device 12, the room management system 210, and the safe 280. The selected period of stay may include a check-in time and a checkout time for the individual.

Additionally, the schedule reminder may be prompted to activate the alarm 13 if positional data 308 of the mobile device 12 indicates that an individual may be leaving the room 208 within a selected time period of their checkout time and the safe 280 is still locked with personal belongings within the safe 280. The alarm 13 is intended to capture the attention of the individual leaving the room 208. The alarm 13 may include a safe contents status 307. In one non-limiting example, a picture (i.e. safe contents status 307) of the personal belongings in the safe 280 may appear on the mobile device 12 when the schedule reminder activates the alarm 13 to remind the individual to remove the personal belongings from the safe 280. Positional data 308 of the mobile device 12 may include a location of the mobile device 12. The location of the mobile device 12 may be relative to the access control 16. The positional data 308 may also include a derivative of the location of the mobile device 12 that is indicative of movement by the mobile device 12. Movement may also be detected by a Microelectromechanical system (MEMS) 57, as described below. Positional data 308 may be determined as described below.

The access control 16 may be wirelessly connected to the wireless access protocol device 212 and communicate wirelessly to the mobile device 12. In a non-limiting embodiment, even if the access control 16 is wirelessly capable, communication between the mobile device 12 and the access control 16 may occur through the server 14. For example, the access control 16 may communication wirelessly through the wireless access protocol device 212 to the server 14 and then the server 14 may relay the communication wirelessly to the mobile device 12. In a further example, the mobile device 12 may communicate wirelessly to the server 14 and the server 14 may communicate wirelessly through the wireless access protocol device 212 to the access control 16. The communication between the server 14 and the mobile device 12 may occur through the wireless access protocol device 212 or another wireless network such as, for example, a cellular network. The access control 16 may be hardwired to the server 14 and thus communication between the mobile device 12 and the access control 16 may occur through the server 14. If the access control 16 is not hardwire connected to the server 14 or wirelessly connected to the server 14, the communication may occur between the access control 16 and the mobile device 12 via short range wireless communication, such as for example Wi-Fi, Bluetooth, ZigBee, infrared, or any other short-range wireless communication method known to one of skill in the art. In an embodiment, the short-range wireless communication is Bluetooth. The mobile device 12 may have to be within a selected range of the access control 16 in order to utilize short-range wireless communication. The access control 16 may also be wired and/or wirelessly connect to the room management system 210. The access control 16 may be wirelessly connected to the room management system 210 through Wi-Fi, Bluetooth, ZigBee, infrared or any other wireless connection known to one of skill in the art.

The safe 280 may be wirelessly connected to the wireless access protocol device 212 and communicate wirelessly to the mobile device 12. In a non-limiting embodiment, even if the safe 280 is wirelessly capable, communication between the mobile device 12 and the safe 280 may occur through the server 14. For example, the safe 280 may communication wirelessly through the wireless access protocol device 212 to the server 14 and then the server 14 may relay the communication wirelessly to the mobile device 12. In a further example, the mobile device 12 may communicate wirelessly to the server 14 and the server 14 may communicate wirelessly through the wireless access protocol device 212 to the safe 280. The communication between the server 14 and the mobile device 12 may occur through the wireless access protocol device 212 or another wireless network such as, for example, a cellular network. The safe 280 may be hardwired to the server 14 and thus communication between the mobile device 12 and the safe 280 may occur through the server 14. If the safe 280 is not hardwire connected to the server 14 or wirelessly connected to the server 14, the communication may occur between the safe 280 and the mobile device 12 via short range wireless communication, such as for example Wi-Fi, Bluetooth, ZigBee, infrared, or any other short-range wireless communication method known to one of skill in the art. In an embodiment, the short-range wireless communication is Bluetooth. The mobile device 12 may have to be within a selected range of the safe 280 in order to utilize short-range wireless communication. The safe 280 may also be wired and/or wirelessly connected to the room management system 210. The safe 280 may be wirelessly connected to the room management system 210 through Wi-Fi, Bluetooth, ZigBee, infrared or any other wireless connection known to one of skill in the art.

The safe 280 may be wirelessly connected to the wireless access protocol device 212 and communicate wirelessly to the access control 16. In a non-limiting embodiment, even if the safe 280 is wirelessly capable, communication between the access control 16 and the safe 280 may occur through the server 14. For example, the safe 280 may communication wirelessly through the wireless access protocol device 212 to the server 14 and then the server 14 may relay the communication wirelessly to the access control 16. In a further example, the access control 16 may communicate wirelessly to the server 14 and the server 14 may communicate wirelessly through the wireless access protocol device 212 to the safe 280. The communication between the server 14 and the access control 16 may occur through the wireless access protocol device 212 or another wireless network such as, for example, a cellular network. The safe 280 may be hardwired to the server 14 and thus communication between the access control 16 and the safe 280 may occur through the server 14. If the safe 280 is not hardwire connected to the server 14 or wirelessly connected to the server 14, the communication may occur between the safe 280 and the access control 16 via short range wireless communication, such as for example Wi-Fi, Bluetooth, ZigBee, infrared, or any other short-range wireless communication method known to one of skill in the art. In an embodiment, the short-range wireless communication is Bluetooth. The access control 16 may have to be within a selected range of the safe 280 in order to utilize short-range wireless communication.

Figure 2:
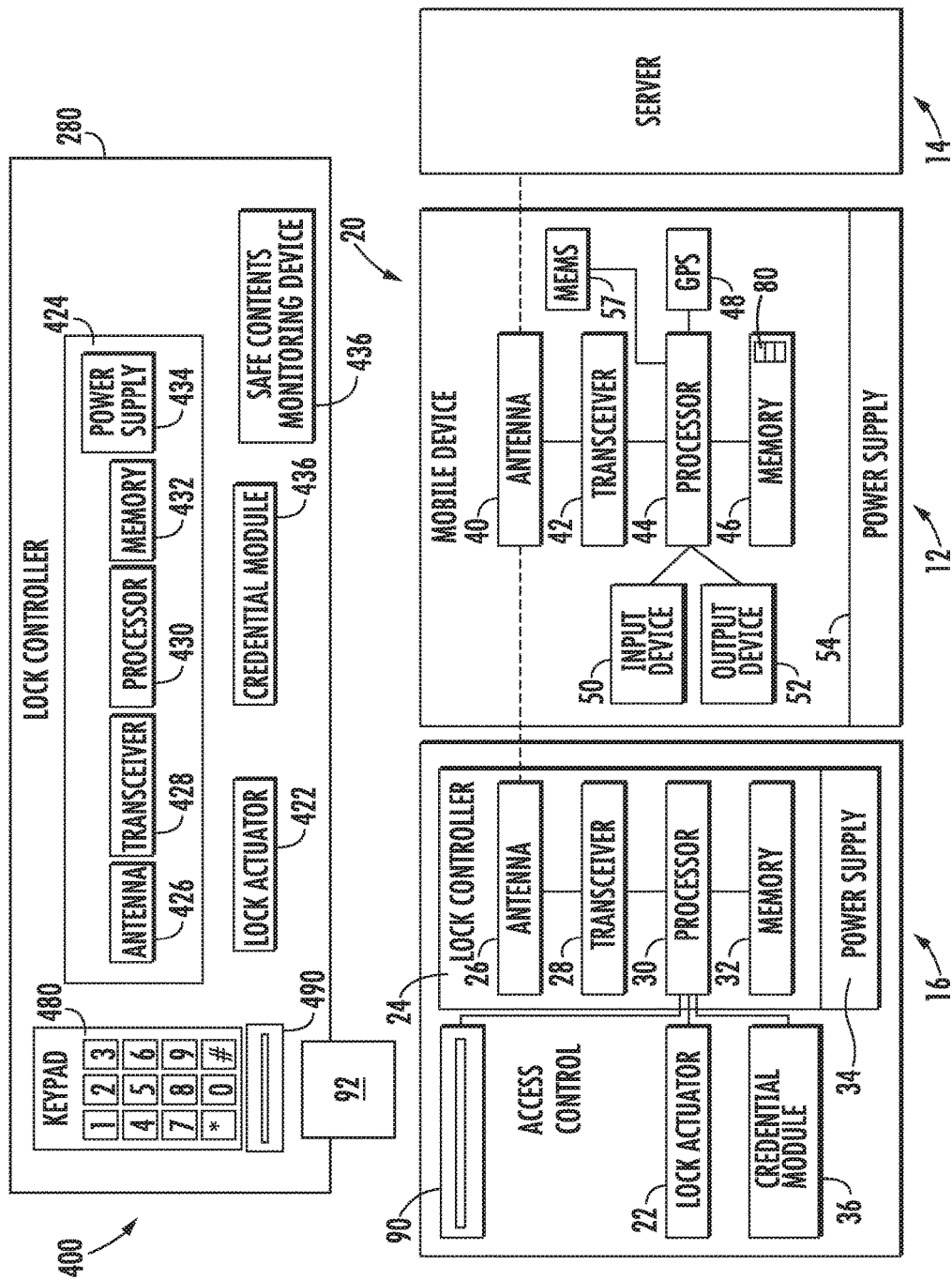
FIG. 2 illustrates a block diagram of an access control, mobile device, a safe, and a server of the safe reminder system of FIG. 1, in accordance with an embodiment of the disclosure.

Referring now to FIG. 2 with continued reference to FIG. 1. FIG. 2 shows a block diagram of an example a safe lock systems 400 and electronic lock system 20 that include the access control 16, the mobile device 12, and the server 14.

The access control 16 generally includes a lock actuator 22, a lock controller 24, a lock antenna 26, a lock transceiver 28, a lock processor 30, a lock memory 32, a lock power supply 34, a lock card reader 90 and a credential module 36. The access control 16 may have essentially two readers, one reader 90 to read a physical key card 92 and the credential module 36 to communicate with the mobile device 12 via the lock processor 30 and the transceiver 28 and antenna 26. The access control 16 is responsive to credentials from the mobile device 12, and may, for example, be a door lock. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom. Such systems include hotel door lock systems. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, infrared, ZigBee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The safe 280 generally includes a lock actuator 422, a lock controller 424, a lock antenna 426, a lock transceiver 428, a lock processor 430, a lock memory 432, a lock power supply 434, a lock card reader 490, a credential module 436, and a key pad 480. The safe 280 may have essentially two readers, one reader 490 to read a physical key card 92 and the credential module 436 to communicate with the mobile device 12 via the lock processor 430 and the transceiver 428 and antenna 426. The safe 280 is responsive to credentials from the mobile device 12 and physical key card 92, such that the credential may unlock and lock the safe 280. The safe 280 may also be responsive to a pin entered via the key pad 480. It is understood that the safe 280 may have multiple configurations and may possess at least one of the key pad 480, the reader 490, and the credential module 436.

Upon receiving and authenticating an appropriate credential from the mobile device 12 using the credential module 436, after receiving card data from lock card reader 490, or a pin via the key pad 480, the lock controller 424 commands the lock actuator 422 to lock or unlock a mechanical or electronic lock. The lock controller 424 and the lock actuator 422 may be parts of a single electronic or electromechanical lock unit, or may be components sold or installed separately.

The lock transceiver 428 is capable of transmitting and receiving data to and from at least the mobile device 12. The lock transceiver 428 may, for instance, be a near field communication (NFC), Bluetooth, infrared, ZigBee, or Wi-Fi transceiver, or another appropriate wireless transceiver. The lock antenna 426 is any antenna appropriate to the lock transceiver 428. The lock processor 430 and lock memory 432 are, respectively, data processing, and storage devices. The lock processor 430 may, for instance, be a microprocessor that can process instructions to validate credentials and determine the access rights contained in the credentials or to pass messages from a transceiver to a credential module 436 and to receive a response indication back from the credential module 436. The lock memory 432 may be RAM, EEPROM, or other storage medium where the lock processor 430 can read and write data including but not limited to lock configuration options. The lock power supply 434 is a power source such as line power connection, a power scavenging system, or a battery that powers the lock controller 424. In other embodiments, the lock power supply 434 may only power the lock controller 424, with the lock actuator 422 powered primarily or entirely by another source, such as user work (e.g. opening a door to the safe 280).

While FIG. 2 shows the lock antenna 426 and the transceiver 428 connected to the processor 430, this is not to limit other embodiments that may have additional antenna 426 and transceiver 428 connected to the credential module 436 directly. The credential module 436 may contain a transceiver 428 and antenna 426 as part of the credential module. Or the credential module 436 may have a transceiver 428 and antenna 426 separately from the processor 430 which also has a separate transceiver 428 and antenna 426 of the same type or different. In some embodiments, the processor 430 may route communication received via transceiver 428 to the credential module 436. In other embodiments the credential module may communicate directly to the mobile device 12 through the transceiver 428. It is understood that while the safe 280 illustrated in FIG. 2 includes a keypad 480, a reader 490, and a credential module 436, embodiments disclosed herein may be applicable to safes including at least one of a keypad 480, a reader 490, and a credential module 436.

The safe 280 may also include a safe contents monitoring device 437 configured to determine a safe contents status 307. In an embodiment, the safe contents monitoring device 437 may be a scale and the safe contents status 307 may be a weight of the contents (i.e. personal belongings) of the safe 280. In an embodiment, the safe contents monitoring device 437 may be a camera and the safe contents status 307 may be an image (e.g. picture) of the contents (i.e. personal belongings) of the safe 280. It is understood that embodiments disclosed herein are not limited to the safe contents monitoring device 437 being a scale or a camera and the safe contents monitoring device 337 may be any other device known to one of skill in the art capable of detecting whether contents are within the safe 280 and/or depicting details of the contents of the safe 280.

The mobile device 12 generally includes a key antenna 40, a key transceiver 42, a key processor 44, a key memory 46, a GPS receiver 48, an input device 50, an output device 52, a key power supply 54, and a Microelectromechanical system (MEMS) 57. The key transceiver 42 is a transceiver of a type corresponding to the lock transceiver 28, 428, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The MEMS sensor 57 may be a sensor such as, for example, an accelerometer, a gyroscope, or a similar sensor known to one of skill in the art.

The positional data 308 may be detected using one or more methods and apparatus. The positional data 308 may be determined by the mobile device 12 and/or the server 14. The positional data 308 may be communicated to the room management system 210, access control 16, safe 280, or other device. The positional data 308 may include a location of the mobile device 12 and/or a movement of mobile device 12 that is a derivative of a location of the mobile device, such as, for example, velocity, acceleration, jerk, jounce, snap . . . etc. The mobile device 12 can determine by the GPS 48, by the MEMS 57, or by triangulating signals from the wireless access protocol device(s) 212 or signals from the access control(s) 16. The mobile device 12 may do calculations based on the received signal strength. The positional data 308 may be crude (i.e. close to access control or far away) or it may be very accurate (i.e. very precise) depending on the method used.

The location of the mobile device 12 may also be detected through triangulation of wireless signals emitted from the mobile device 12 or signal strength between the mobile device 12 and the wireless access protocol device 212. The location of the mobile device 12 may be detected using any other desired and known location detection/position reference means.

Figure 3:
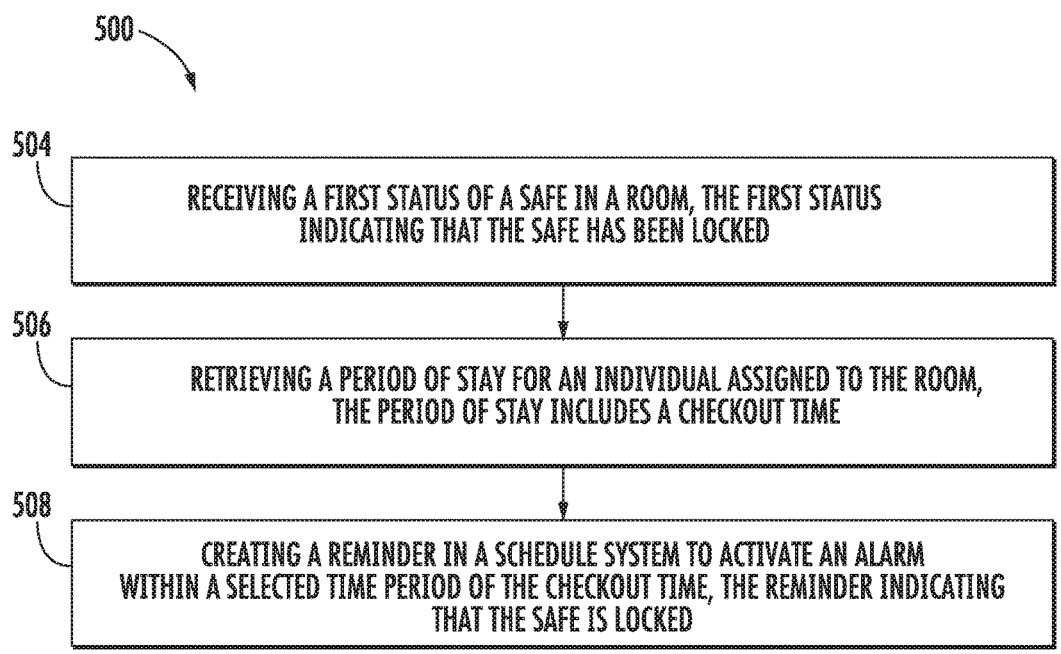
FIG. 3 is a flow diagram illustrating a method of detecting when a personal item is left in a safe, according to an embodiment of the present disclosure.

Referring now to FIG. 3 with continued reference to FIGS. 1-2. FIG. 3 shows a flow chart of method 500 of detecting when a personal item is left in a safe 280, in accordance with an embodiment of the disclosure. The method 500 may be performed by the mobile device 12, the room management system 210, and/or the server 14. At block 504, a first status 306 of a safe 280 in a room 208 is received. The first status 306 indicates that the safe 280 has been locked. As mentioned above, the safe 280 advertises its status via a wireless signal. In an embodiment, the wireless signal is a Bluetooth advertisement. For example, as the individual comes within range of the wireless signal, their mobile device 12 detects the wireless signal and receives the status 306 of the safe 280. A schedule system receives the first status 306 and processes the data to determine the status of the safe when the first status is received. The method may also include that it is determined that the safe 280 is assigned to the same room 208 as the individual. At block 506, a period of stay is retrieved for an individual assigned to the room 208, the period of stay includes a checkout time. For example, an app 80 on the mobile device 12 may be in communication with the server 14 to download information for the period of stay of an individual assigned to the room 208, such as, for example, checkout time. At block 506 the status 306 of safe 280 that is associated with room 208 is now known in relation to the checkout time from room 208.

At block 508, a reminder is created in a schedule system to activate an alarm 13 within a selected time period of the checkout time, the reminder indicating that the safe 280 is locked and personal belongings may still be within the safe 280. The selected time period of the checkout may be either before the checkout time or after the checkout time. An individual may be able to configure the selected period of time through the application 80 on the mobile device 12. The schedule system may be located within (i.e. installed) the mobile device 12 application 80, the room management system 210, and/or the server 14. The alarm 13 may be activated when a current time is within the selected time period of the checkout time and/or a most recent status 306 of the safe 280 indicates that the safe 280 is still locked. If a second status 306 of the safe 280 in the room 208 is received indicating that the safe 280 has been unlocked then the reminder may be deleted in the schedule system.

The alarm 13 may automatically be activated every time an individual actuates an access control 16 (i.e. unlocks/locks the lock on the door) and a current time is within the selected time period of the checkout time. Alternatively, the alarm 13 may only be activated if it is determined that a location of the individual assigned to the room 208 indicates that the individual is leaving the room 208 within a second selected time period of the checkout time. The location of the individual assigned to the room 208 may be detected by collecting positional data of a mobile device 12 belonging to the individual.

While the above description has described the flow process of FIG. 3 in a particular order, it should be appreciated that unless otherwise specifically required in the attached claims that the ordering of the steps may be varied.

Figure 4:
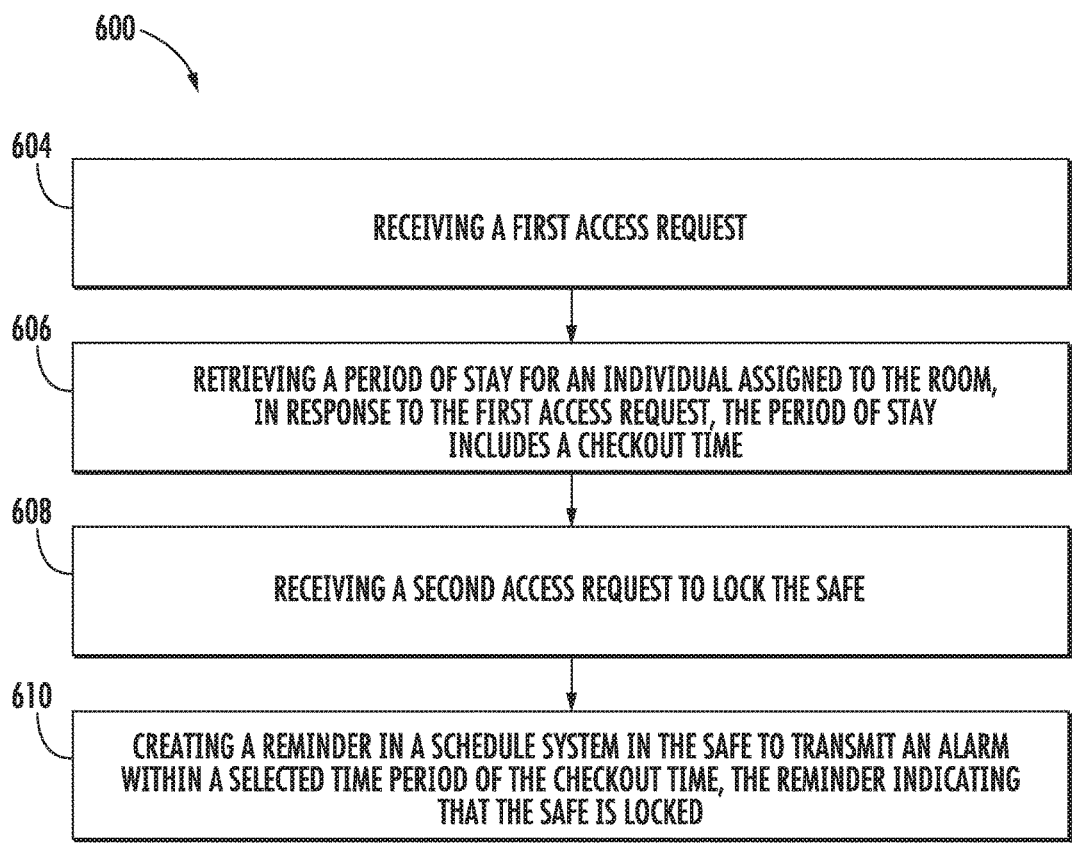
FIG. 4 is a flow diagram illustrating a method of detecting when a personal item is left in a safe, according to an embodiment of the present disclosure.

Referring now to FIG. 4 with continued reference to FIGS. 1-2. FIG. 4 shows a flow chart of method 600 of detecting when a personal item is left in a safe 280, in accordance with an embodiment of the disclosure. The method 600 may be performed by the safe 280. At block 604, a first access request 304. The first access request 304 may indicate that an access control 16 operably associated with a door 202 to the room 208 has been actuated. Alternatively, the first access request 304 may have been transmitted to the safe 280 from at least one of a mobile device 12 and a key card 92. At block 606, a period of stay is received for an individual assigned to the room 208 in response to the first access request 304. The period of stay includes a checkout time. The period of stay may be indicated by data contained within the first access request 304. In an embodiment, blocks 604 and 606 may be reduced to a single step if an individual uses their mobile device 12 or key card 92 to open the safe 280. For example, an access request 304 may be transmitted from the mobile device 12 to the safe 280, then the safe 280 can read the period of stay and checkout time directly from the access request 304 and/or from the mobile device 12. In another example, an access request 304 may be transmitted (e.g. key card 92 inserted into the safe 280, key card 92 placed proximate to a reader 90 of the safe 280) from the key card 92 to the safe 280, then the safe 280 can read the period of stay and checkout time directly from the key card 92. At block 608, a second access request 304 to lock the safe 280 is received. In one example, the first access request 304 is an authentication request to the safe 280 by either the mobile device 12 or key card 92 and the second access request 304 to lock the safe 280 is an entered code on keypad 480. In another example, the first access request 304 is a request to unlock the access control 16 and this event is shared with the safe 280 and the second access request 304 to lock the safe 280 is an entered code on keypad 480.

At block 610, a reminder is created in a schedule system in the safe 280 to transmit an alarm 13 within a selected time period of the checkout time. The reminder indicates that the safe 280 is locked. The safe 280 is configured to transmit the alarm 13 to at least one of a mobile device 12 and a room management system 210 when a current time is within the selected time period of the checkout time and/or a most recent status 306 of the safe 280 indicates that the safe 280 is locked. As mentioned above, the safe 280 may transmit the alarm 13 via a wireless signal. Additionally, an alarm 13 may also be activated on the safe, such as, for example, an audible beep. In an embodiment, the wireless signal is Bluetooth. For example, the safe 280 may transmit a Bluetooth advertisement with data indicating the safe is in alarm and an individual's nearby mobile device 12 may receive the Bluetooth advertisement and provide an alarm indication on the screen or via vibration or audio output from the mobile device to alert the individual that the safe is in alarm. If an access request 304 is received to unlock the safe 280 then the reminder is deleted in the schedule system in the safe 280 and if there is an active alarm 13 it will be deactivated.

The alarm 13 may automatically be activated every time an individual actuates an access control 16 (i.e. unlocks/locks the lock on the door) and a current time is within the selected time period of the checkout time. Alternatively, the alarm 13 may only be activated if it is determined by the mobile device 12 that a location of the individual assigned to the room 208 indicates that the individual is leaving the room 208 within a second selected time period of the checkout time. The location of the individual assigned to the room 208 may be detected by collecting positional data 308 of a mobile device 12 belonging to the individual. In one example, the positional data may be determined by received signal strength of a wireless signal emitted from the access control 16 or safe 280. For example, when the individual is in the room 208 and their mobile device 12 is within range of a Bluetooth signal from the safe 280 and the mobile device 12 knows when it has left the room 208 when it is no longer within range of the Bluetooth signal from the safe 280. It is understood that there are many different methods to determine that a mobile device 12 has left the room 208 and embodiments are not limited to the methods disclosed herein.

In an embodiment, the alarm 13 may be transmitted continuously (i.e. Bluetooth beacon sent at a periodic interval) from the safe 280 to the mobile device 12 and a position of the mobile device 12 may be determined by proximity to the safe 280. For example, when the mobile device 12 is close to the safe, it will 'hear' the Bluetooth beacon and that will trigger a notification message to the mobile device 12 based on the beacon and/or the mobile device 12 may choose to NOT activate the alarm 13 until the mobile device 12 is detected actually leaving the room 208 upon check out. Advantageously, by delaying activation of the alarm 13 until the individual is detected leaving the room 208 for check out, the individual will not get a bunch of nuisance alarms while they are in the room 208 but they DO get an alarm 13 as they are leaving the room 208.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for detecting when a personal item is left in a safe, the system comprising:
   a processor; and
   a memory comprising computer-executable instructions that, when executed by the processor, cause the processor to perform operations, the operations comprising:
   receiving a first status of the safe in a room, the safe including a lock actuator to lock or unlock a mechanical or electronic lock of the safe, the first status indicating that the safe has been locked;
   retrieving a period of stay for an individual assigned to the room, the period of stay includes a checkout time; and
   creating a reminder in a schedule system to activate an alarm within a selected time period of the checkout time, the reminder indicating that the safe is locked.

2. The system of claim 1, wherein the operations further comprise:
   activating the alarm when a current time is within the selected time period of the checkout time.

3. The system of claim 1, wherein the operations further comprise:
   activating the alarm when a current time is within the selected time period of the checkout time and a most recent status of the safe indicates that the safe is locked.

4. The system of claim 1, wherein the operations further comprise:
   receiving a second status of the safe in the room, the second status indicating that the safe has been unlocked; and
   deleting the reminder in the schedule system.

5. The system of claim 1, wherein the operations further comprise:
   detecting whether an access control operably associated with a door to the room has been actuated; and
   activating the alarm when a current time is within the selected time period of the checkout time and the access control has been actuated.

6. The system of claim 1, wherein the operations further comprise:
   detecting a location of the individual assigned to the room; and
   activating the alarm when the location of the individual indicates that the individual is leaving the room within a second selected time period of the checkout time.

7. The system of claim 6, wherein the detecting the location of the individual assigned to the room further comprises:
   collecting positional data of a mobile device belonging to the individual.

8. The system of claim 1, wherein:
   the first status of the safe is advertised by the safe using Bluetooth, wherein the schedule system receives the first status through a Bluetooth advertisement and processes the data in the advertisement to determine the status of the safe when the first status is received.

9. The system of claim 1, wherein:
   the reminder includes a safe contents status depicting at least one of a weight of contents of the safe and an image of contents of the safe.

10. The system of claim 1, wherein:

the system is at least one of a mobile device, a room management system, and a server, and wherein the schedule system is installed within at least one of the mobile device, the room management system, and the server.

11. A safe comprising:

a lock actuator to lock or unlock a mechanical or electronic lock of the safe;

a processor; and a memory comprising computer-executable instructions that, when executed by the processor, cause the processor to perform operations for detecting when a personal item is left in the safe, the operations comprising:

receiving a first access request;

receiving a period of stay for an individual assigned to a room in response to the first access request, the period of stay includes a checkout time;

receiving a second access request to lock the safe; and creating a reminder in a schedule system in the safe to transmit an alarm within a selected time period of the checkout time, the reminder indicating that the safe is locked.

12. The safe of claim 11, wherein the operations further comprise:

transmitting the alarm to at least one of a mobile device and a room management system when a current time is within the selected time period of the checkout time.

13. The safe of claim 11, wherein the operations further comprise:

transmitting the alarm to at least one of a mobile device and a room management system when a current time is within the selected time period of the checkout time and a most recent status of the safe indicates that the safe is locked.

14. The safe of claim 11, wherein the operations further comprise:

receiving a third access request to unlock the safe; and deleting the reminder in the schedule system.

15. The safe of claim 11, wherein the operations further comprise:

detecting an access request to the access control operably associated with a door to the room; and activating the alarm when a current time is within the selected time period of the checkout time and the access control has been actuated by the access request.

16. The safe of claim 12, wherein the operations further comprise:

activating the alarm from at least one of a mobile device and a room management system when a location of the individual indicates that the individual is leaving the room within a second selected time period of the checkout time.

17. The safe of claim 16, wherein:

the location of the individual assigned to the room is determined by collecting positional data of a mobile device belonging to the individual.

18. The safe of claim 11, wherein:

the first request indicates that an access control operably associated with a door to the room has been actuated.

19. The safe of claim 11, wherein:

the first request is transmitted to the safe from at least one of a mobile device and a key card.

20. The safe of claim 19, wherein:

the period of stay is received from at least one of the mobile device and the key card.

* * * * *